(No Model.)

J. G. HILL.
WRENCH.

No. 551,163.                              Patented Dec. 10, 1895.

Witnesses,
Robert Orcutt
Dennis Sumby

Inventor:
Joseph G. Hill.
By James L. Norris
Atty.

United States Patent Office.

JOSEPH G. HILL, OF NEW YORK, N. Y., ASSIGNOR TO ARTHUR PARTON HILL, OF SAME PLACE.

WRENCH.

SPECIFICATION forming part of Letters Patent No. 551,163, dated December 10, 1895.

Application filed March 21, 1895. Serial No. 542,650. (No model.)

*To all whom it may concern:*

Be it known that I, JOSEPH G. HILL, a citizen of the United States, residing at New York city, in the county of New York and State of New York, have invented new and useful Improvements in Wrenches, of which the following is a specification.

This invention relates to that type of nut and other wrenches comprising two movable jaws having right and left hand screw-threaded connections with a rotary handle, in such manner that by the rotary movement of the handle the two jaws are adjusted toward or from each other, according to the direction in which the handle is turned.

The objects of my invention are to improve the prior construction of wrenches of the character alluded to; to provide a strong, short, and compact rotary handle; to provide a novel construction whereby the right and left hand screw-threads of the handle portion remain constantly within and are concealed by the handle during all adjustments of the two jaws, and to provide a comparatively short handle composed of two internally and reversely screw-threaded tubular portions of different length, the short tubular portion being housed entirely within and detachably secured to the long tubular section, whereby a wrench-handle is provided which can be conveniently manipulated and the two jaws easily and rapidly adjusted.

To accomplish these objects my invention consists, among other things, of a handle composed of two reversely-threaded tubular sections of different length connected, respectively, with two jaws and having the short section located wholly within the long section, as will more fully hereinafter appear.

The invention also consists in the features of construction and the combination or arrangement of parts hereinafter described and claimed, reference being made to the accompanying drawings, in which—

Figure 1:
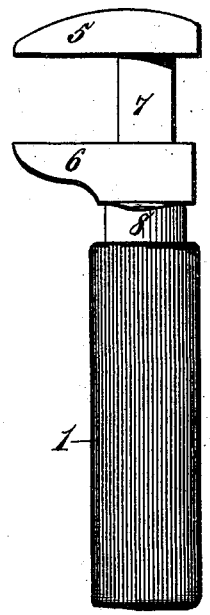
Figure 2:
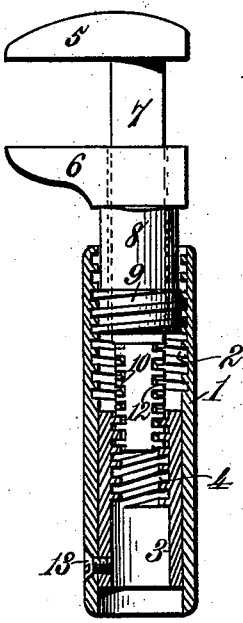
Figure 3:
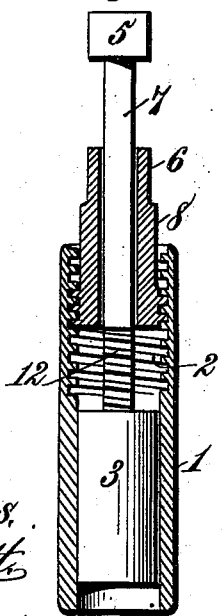
Figure 4:
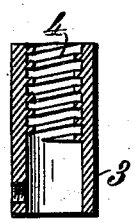

Figure 1 is a side elevation of a nut-wrench constructed in accordance with my invention. Fig. 2 is a longitudinal central sectional view of the same, showing the two jaws and their shanks in side elevation. Fig. 3 is a longitudinal central sectional view in a plane at right angles to the plane of section, Fig. 2, showing the short tubular section of the handle and one of the jaws and its shank in elevation; and Fig. 4 is a detail longitudinal sectional view of the short tubular section of the handle.

In order to enable those skilled in the art to make and use my invention, I will now describe the same in detail, referring to the drawings, wherein—

The numeral 1 indicates a cylindrical tubular section, composed of a tube of metal, which may be drawn seamless, and is open at both ends, although the latter feature of construction is not indispensable. The main tubular section 1 of the handle is shown of uniform diameter, and its inner or upper end is formed with an internal screw-thread 2, which extends along the internal surface of the section for nearly one-half the length thereof. In the lower or outer end portion of the main tubular section 1 is arranged a short secondary tubular section 3, having its interior provided with a screw-thread 4, which extends approximately about one-half the length of the short section.

The screw-threads 2 and 4 are reversely arranged—that is to say, one is a right-hand screw-thread and the other is a left-hand screw-thread. As here shown the internal screw-thread 2 of the main tubular section 1 is a right-hand screw-thread, while the internal screw-thread 4 of the secondary tubular section 3 is a left-hand screw-thread, but this arrangement may be reversed if desired.

The handle constructed in the manner described comprises two tubular sections, preferably cylindrical, which are of different length, and the short section 3 is located entirely within the long section 1 in such manner that in all adjustments of the wrench-jaws hereinafter explained the screw-threads of the handle portion remain constantly housed within the handle. By placing the short tubular section 3 inside of the long tubular section 1, in the manner described and shown, I produce a very strong wrench-handle, which is comparatively short, very compact, and can be conveniently manipulated.

The two movable jaws 5 and 6 of the wrench are provided, respectively, with shanks 7 and 8. The shank 8 is preferably cylindrical, and is constructed at its lower end with an external screw-thread 9, engaging the internal screw-thread 2 of the main tubular section 1 of the wrench-handle. The shank 7 of the jaw 5 is preferably square, or rectangular in cross-section, and extends through a longitudinal orifice formed in the shank 8. The shank 7 is of a length considerably greater than the shank 8, so that the inner end portion of the shank 7 projects beyond the inner end of the shank 8. The inner end portion of the shank 7 is provided at its opposite edges with sections of screw-threads 10 and 12, which engage the internal screw-thread 4 of the short tubular section 3 of the wrench-handle.

The short tubular section 3 of the wrench-handle is designed to be removed and replaced, and for this purpose the short tubular section is secured within the long section 1, through the medium of a metal screw 13, or any other suitable device which will render it possible to insert the short tubular section, secure it in place, and remove the same whenever desired.

The construction and arrangement of the parts are such that when the handle is rotated the two jaws 5 and 6 are caused to move toward or from each other, according to the direction in which the handle is turned.

I prefer to make the sections 1 and 3 circular in cross-section, and to mill the external surface of the long section 1 to facilitate the rotary movements thereof.

By constructing wrench-handles of cylindrical tubular sections they can be rapidly manufactured from tubes, and consequently the production of wrenches of the character embodying the principles of my invention is largely increased.

In assembling the parts of the wrench together the short tubular section 3 is screwed onto the threaded parts of the shank 7, and then the long tubular section 1 is slid into position over the short section 3 and screwed onto the threaded part 9 of the shank 8. After the two tubes are in proper position, they are rigidly secured together through the medium of the screw 13, or any other means suitable for the purpose, so that the two parts of the handle must turn in unison, for the purpose of adjusting the two jaws of the wrench relatively to each other.

In my invention a wrench having two jaws connected by right and left hand screw-threads with a handle is made very compact as regards dimensions, it is susceptible of being economically manufactured, and possesses all the strength necessary in an article of this kind.

Having thus described my invention, what I claim is—

1. The combination with two movable jaws, of a handle composed of two reversely threaded, tubular sections of different length, connected respectively with the two jaws, and the short section being located entirely within and rigidly secured to the long section, substantially as described.

2. The combination with two movable jaws, of a handle composed of two internally and reversely threaded, tubular sections of different length, respectively engaging threaded parts of the movable jaws, and the short section located entirely within the long section and detachably secured thereto, substantially as described.

3. The combination with two jaws, each movable to and from the other and having right and left-hand screw-threaded shanks, one of which extends through the other, of a rotary-handle composed of two internally and reversely threaded, tubular sections of different length, respectively engaging the threaded parts of the shanks, and the short section located entirely within and rigidly secured to the long section, substantially as and for the purposes described.

4. A wrench-handle consisting of two tubular sections of different length, the short section being arranged entirely within and rigidly secured to the long section, substantially as and for the purposes described.

5. In a wrench having movable jaws, a handle consisting of two tubular sections of different length, connected respectively with the jaws, and the short section being located wholly within the long section and rigidly secured thereto, substantially as and for the purposes described.

In testimony whereof I have hereunto set my hand and affixed my seal in presence of two subscribing witnesses.

JOSEPH G. HILL. [L. S.]

Witnesses:
ARTHUR P. HILL,
A. F. D. CAROTEW.